(12) United States Patent
Lee et al.

(10) Patent No.: US 8,811,161 B2
(45) Date of Patent: Aug. 19, 2014

(54) METHOD OF CREATING AND DELETING SERVICE FLOW FOR ROBUST HEADER COMPRESSION, AND WIRELESS COMMUNICATION SYSTEM SUPPORTING THE SAME

(75) Inventors: Dong Hyun Lee, Yongin-si (KR); Bong Ho Kim, San Jose, CA (US); Su Lyun Sung, Anyang-si (KR)

(73) Assignee: Intellectual Discovery Co., Ltd., Seoul (KR)

( * ) Notice: Subject to any disclaimer, the term of this patent is extended or adjusted under 35 U.S.C. 154(b) by 739 days.

(21) Appl. No.: 12/234,397

(22) Filed: Sep. 19, 2008

(65) Prior Publication Data
US 2009/0080374 A1 Mar. 26, 2009

Related U.S. Application Data

(60) Provisional application No. 60/994,815, filed on Sep. 21, 2007.

(30) Foreign Application Priority Data

Mar. 14, 2008 (KR) .......................... 10-2008-0023967

(51) Int. Cl.
*G01R 31/08* (2006.01)
*H04L 12/28* (2006.01)

(52) U.S. Cl.
USPC ............ 370/229; 370/230; 370/236; 370/389

(58) Field of Classification Search
None
See application file for complete search history.

(56) References Cited

U.S. PATENT DOCUMENTS

| | | | |
|---|---|---|---|
| 2006/0104278 A1* | 5/2006 | Chang et al. ................... | 370/392 |
| 2007/0195764 A1* | 8/2007 | Liu et al. ....................... | 370/389 |
| 2008/0056273 A1* | 3/2008 | Pelletier et al. ........... | 370/395.21 |
| 2008/0080559 A1* | 4/2008 | Singh ............................. | 370/477 |
| 2008/0263631 A1* | 10/2008 | Wang et al. ....................... | 726/2 |

OTHER PUBLICATIONS

C. Borman, et al., Robust Header Compression (ROHC), Framework and four profiles: RTP, UDP, ESP, and uncompressed, The Internet Society (2001).
Jonsson, L-E., et al., Robust Header Compression (ROHC), Terminology and Channel Mapping Examples, The Internet Society (Apr. 2004).

* cited by examiner

*Primary Examiner* — Jutai Kao (57) ABSTRACT

A method of creating a service flow for ROHC in a control station is disclosed, which can establishes a ROHC channel between ROHC entities, the method comprising obtaining a first ROHC parameter from a ROHC entity of the control station, upon receiving a subscriber profile to which ROHC is applied; and transmitting a first message including the first ROHC parameter for requesting the creation of service flow to a mobile station related with the subscriber profile and a base station performing a dynamic service addition (DSA) procedure through the use of a second message including the first ROHC parameter.

12 Claims, 8 Drawing Sheets

FIG.1

----------- Policy of ROHC for pre-provisioned Service Flow
............ Policy of ROHC for Dynamic Service Flow-NW initiated

- - - - - - - - Policy of ROHC for pre-provisioned Service Flow
................ Policy of ROHC for Dynamic Service Flow-NW initiated

METHOD OF CREATING AND DELETING SERVICE FLOW FOR ROBUST HEADER COMPRESSION, AND WIRELESS COMMUNICATION SYSTEM SUPPORTING THE SAME

CROSS-REFERENCE TO RELATED APPLICATIONS

This application claims the benefit under 35 U.S.C. §119 (e) of U.S. Provisional Application Ser. No. 60/994,815, filed Sep. 21, 2008, and the benefit under 35 U.S.C. §119 of Korean Patent Application No. 10-2008-23967, filed Mar. 14, 2008, the entire disclosures of which are herein incorporated by reference.

BACKGROUND OF THE INVENTION

1. Field of the Invention

The present invention relates to a method of creating and deleting a service flow for Robust Header-Compression (ROHC) and a wireless communication system supporting the same, and more particularly, to a method of creating and deleting a service flow for establishing a ROHC channel between ROHC entities and a wireless communication system supporting the same.

2. Discussion of the Related Art

For a wireless communication system, it is especially important to improve the utilization efficiency of limited resources. Thus, it becomes more difficult to utilize an IP protocol in a wireless interface. This is because that a portion of headers occupy a large part in data to be transmitted in the IP protocol, that is, a portion for payload becomes smaller. For instance, if VoIP is implemented using IPv4, a large amount of radio frequency bandwidth is wasted on transmitting the headers. Furthermore, a header size of IPv6 is increased so that the loss of bandwidth becomes more serious.

Under inferior communication circumstances, a bit error ratio (BER) of wireless interface, and round trip time of uplink and downlink are increased largely, which may cause problems in related art header compression methods.

In this reason, there has been arisen the necessity to amend the header compression method to be appropriate for various IP protocols and packet transmissions through the wireless interface. Especially, there is the increasing demand for the efficient header compression method which can be utilized even under the inferior circumstances with the high bit error ratio and long delay. Thus, "Internet Engineering Task Force" standardizes the header compression method known as "Robust Header Compression".

One of the most important facts to develop the ROHC is that a redundancy exists among a plurality of IP headers used for the packet transmission, as well as within the packet. That is, most information within the header is not changed during the data packet transmission. In this case, the information included in the header can be easily reconstructed in a data-receiving station even though the information is not transmitted.

With reference to "IEEE 802.16-2004 October 2004, Air Interface for Fixed and Mobile Broadband Wireless Access Systems Amendment for Physical and Medium Access Control Layers for Combined Fixed and Mobile Operation in Licensed Bands, August 2004", "IEEE 802.16e-2005 March 2006, Physical and Medium Access Control Layers for Combined Fixed and Mobile Operation in Licensed Bands", "RFC 3095, Robust Header Compression (ROHC): Framework and four profiles: RTP, UDP, ESP, and uncompressed, Bormann, C., July 2001", "RFC 3759, Robust Header Compression (ROHC): Terminology and Channel Mapping Examples, L-E. Jonsson, April 2004", and "WiMAX End-to-End Network Systems Architecture", it is known that "WIBRO technology" and "WiMAX NWG" (WiMAX Worldwide Interoperability for Microwave Access Forum Network Working Group) are trying to provide a wireless Internet service to a mobile station through the use of header compression method such as the ROHC based on IEEE 802.16 technology standards.

However, there are unsolved problems considering structures and procedures for a ROHC function to realize ROHC function within the WiMAX network.

SUMMARY OF THE INVENTION

Accordingly, the present invention is directed to a method of creating and deleting a service flow for Robust Header-Compression (ROHC) and a wireless communication system supporting the same that substantially obviates one or more problems due to limitations and disadvantages of the related art.

An object of the present invention is to provide a ROHC parameter negotiation method between ROHC entities during a service flow creation procedure for ROHC, and a wireless communication system supporting the same.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, a method of creating a service flow for ROHC (Robust Header Compression) in a control station comprises, upon receiving a subscriber profile to which ROHC is applied, obtaining a first ROHC parameter from a ROHC entity of the control station; and transmitting a first message including the first ROHC parameter for requesting the creation of service flow to a base station performing a dynamic service addition (DSA) procedure with a mobile station related with the subscriber profile through the use of a second message including the first ROHC parameter.

In another aspect of the present invention, a method of creating a service flow for ROHC in a base station comprises, upon receiving a first message including a first ROHC parameter for requesting the creation of service flow from a control station, determining whether or not the service flow creation request is accepted; and when it is determined that the service flow creation request is accepted, performing a DSA procedure with a mobile station corresponding to the service flow through the use of a second message including the first ROHC parameter.

In another aspect of the present invention, a method of creating a service flow of ROHC in a mobile station comprises, upon receiving a DSA request message from a base station, checking whether or not the DSA request message includes a first ROHC parameter; when it is determined that the DSA request message includes the first ROHC parameter, transmitting the first ROHC parameter to a ROHC entity of the mobile station, and obtaining a second ROHC parameter for a ROHC negotiation from the ROHC entity; and transmitting a DSA response message including the second ROHC parameter to the base station.

In another aspect of the present invention, a method of creating a service flow for ROHC comprises receiving a subscriber profile including dynamic service flow information having a ROHC policy with a policy and charging rules function (PCRF) during an establishing procedure of dynamic service flow, and determining whether or not the dynamic service flow should be applied by ROHC; and initiating a procedure of the dynamic service flow with ROHC, and triggering a ROHC negotiation procedure with a mobile station related with the subscriber profile.

In another aspect of the present invention, a method of deleting a service flow for ROHC in a base station comprises, upon receiving a first message including service flow information for requesting a deletion of the service flow from a control station, determining whether or not the service flow deletion request is accepted; and, when it is determined that the service flow deletion request is accepted, performing a dynamic service deletion (DSD) procedure with a mobile station corresponding to the service flow through the use of a second message including the service flow information.

In another aspect of the present invention, a wireless communication system comprises a control station configured to obtain a first ROHC parameter from a ROHC entity when a subscriber profile to be applied by ROHC is obtained, and transmit a first message including the first ROHC parameter for requesting a creation of a service flow for the ROHC to a base station; and a base station configured to perform a dynamic service addition (DSA) procedure with a mobile station related with the subscriber profile through the use of second message including the first ROHC parameter.

Accordingly, the present invention can realize the advantage of creating the correct service flow for the ROHC channel establishment in the wireless communication system including the ROHC entity, and also can realize the structure of wireless communication system supporting the same.

Also, the message is transmitted through the use of service flow information including the ROHC parameter during the service flow creation procedure for the ROHC, whereby it is possible to perform the ROHC parameter negotiation between the ROHC entities.

The service flow creation procedure for ROHC uses the service flow information including the classification rule, so that is enables the classification procedure to determine whether or not the ROHC should be applied to the packet in the wireless communication system using the ROHC.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings.

DETAILED DESCRIPTION OF THE INVENTION

Reference will now be made in detail to the preferred embodiments of the present invention, examples of which are illustrated in the accompanying drawings. Wherever possible, the same reference numbers will be used throughout the drawings to refer to the same or like parts.

Before describing preferred embodiments of the present invention, terms to be used therein will be briefly explained as follows.

RObust Header Compression function (ROHC function): functional entity including ROHC compressor and ROHC de-compressor defined in RFC3095

ROHC service flow (ROHC SF): 802.16e service flow which is mapped to a ROHC channel, that is, a service flow in which a convergence sub-layer (CS) type is specified as "Packet, IP with ROHC header compression"

ROHC channel: logical unidirectional point to point channel for transmitting ROHC packets from the ROHC compressor to the ROHC de-compressor (see Section 2 of RFC3757)

ROHC compressor: functional entity which inspects IP headers, and compresses the IP headers into ROHC headers with ROHC header contexts (see an exemplary explanation about ROHC compressor in RFC3757)

ROHC de-compressor: functional entity which maintains header contexts, and reconstructs original headers from compressed headers (see an exemplary explanation about ROHC de-compressor in RFC3757)

Per-channel negotiation: procedure to negotiate per-channel parameters between the ROHC compressor and the ROHC de-compressor Per-channel parameters: A ROHC channel is based on a number of parameters to form parts of established channel state and per-context state Hereinafter, a method of creating and deleting a service flow for Robust Header-Compression (hereinafter, referred to as "ROHC") according to the present invention and a wireless communication system supporting the same will be described with reference to the accompanying drawings.

Figure 1:
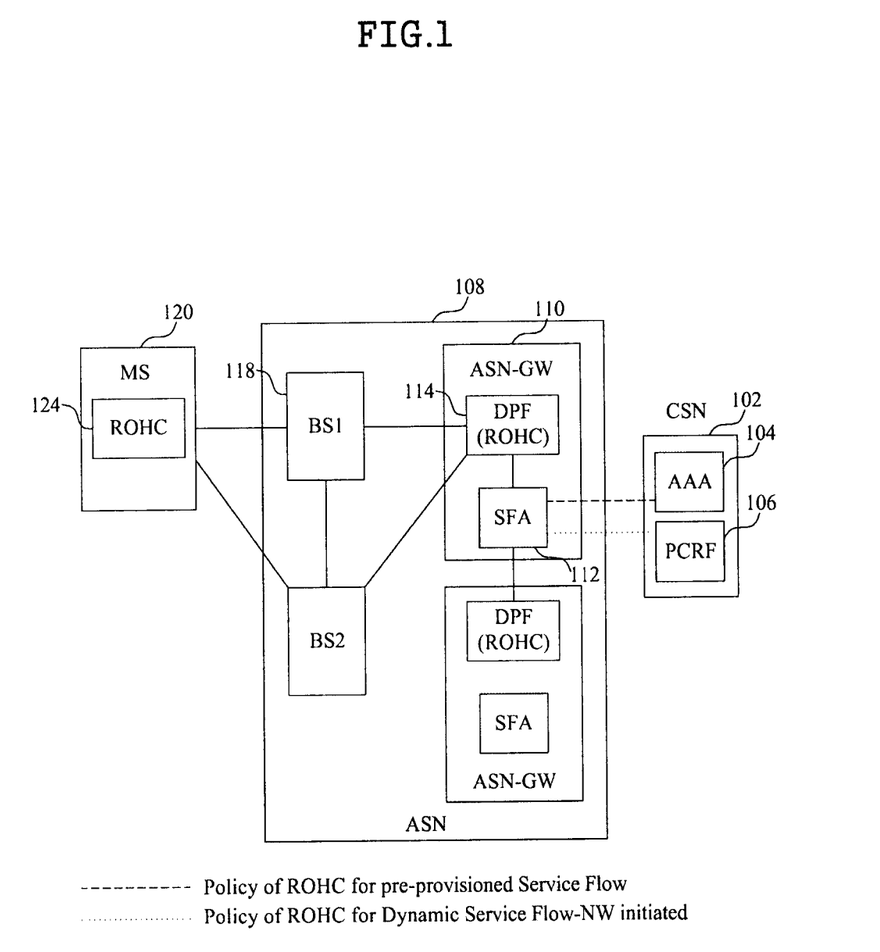
FIG. 1 is a block diagram illustrating a wireless communication system supporting creation and deletion of a service flow for ROHC according to one embodiment of the present invention.

FIG. 1 is a block diagram illustrating a wireless communication system supporting a creation of service flow for ROHC according to one embodiment of the present invention.

Referring to FIG. 1, a wireless communication system according to one embodiment of the present invention includes a connectivity service network (CSN) 102, an access service network (ASN) 108, and a mobile station (MS) 120. The wireless communication system transmits ROHC downlink packets from the connectivity service network (CSN) 102 to the mobile station (MS) 120, and transmits ROHC uplink packets from the mobile station (MS) 120 to the connectivity service network (CSN) 102.

The connectivity service network (CSN) 102 includes an authentication-authorization-accounting (AAA) 104, and a policy and charging rules function (PCRF) 106. For the access service network (ASN) 108 and the mobile station (MS) 120, the connectivity service network (CSN) 102 performs functions of user authentication, authorization and accounting management through the authentication-authorization-accounting (AAA) 104, and also generates both a billing-related rule and a network service policy for users through the policy and charging rules function (PCRF) 106. In addition, the connectivity service network (CSN) 102 includes a home agent (HA, not shown) supporting the mobility of mobile station (MS) 120. That is, the connectivity service network (CSN) 102 transmits the data packet from the home agent (HA, not shown) to the mobile station (MS) 120 through the access service network (ASN) 108.

The authentication-authorization-accounting (AAA) 104 transmits a subscriber profile including a ROHC policy during a user-authentication procedure for a pre-provisioned service flow to an access service network gateway (ASN-GW) 110, and maintains the subscriber profile including the ROHC policy. According as the aforementioned functions are performed by the authentication-authorization-accounting (AAA) 104, the mobile station (MS) 102 and the access service network gateway (ASN-GW) 110 serving as a control station (not shown) can recognize whether or not the ROHC should be applied.

The policy and charging rules function (PCRF) 106 transmits the subscriber profile including ROHC policy to the access service network gateway (ASN-GW) 110 for the dynamic service flow, so that the mobile station (MS) 120 and the access service network gateway (ASN-GW) 110 can recognize whether or not a ROHC packet transmitting/receiving method is applied.

The access service network (ASN) 108 includes the access service network gateway (ASN-GW) 110 corresponding to the control station, and a base station 118. The access service network (ASN) 108 performs a wireless interface function between the base station (BS1) 118 and the mobile station (MS) 120, a Layer-2 connection establishment function, a network discovery function, a network selection function, a transmission function for a Layer-3 connection establishment of the mobile station (MS) 120, and a radio resource management function.

The access service network gateway (ASN-GW) 110 includes a service flow authorization (SFA) 112, a data path function (DPF) 114, and a ROHC function (not shown). The access service network gateway (ASN-GW) 110 compresses downlink packets by ROHC, and transmits them to the base station 118. Also, the access service network gateway (ASN-GW) 110 decompresses ROHC uplink packets by ROHC, and transmits them to the connectivity service network (CSN) 102. At this time, the ROHC function is arranged together with the data path function (DPF) 114, wherein the ROHC function includes a ROHC compressor (not shown) and a ROHC de-compressor (not shown).

The service flow authorization (SFA) 112 receives the ROHC policy from the authentication-authorization-accounting (AAA) 104 or the policy and charging rules function (PCRF) 106, and generates and distributes a classification rule for ROHC. Also, the service flow authorization (SFA) 112 exchanges information of the service flow with the ROHC function 124 of the mobile station (MS) 120 through a service flow management (SFM, not shown) of the base station 118.

If the mobile station (MS) 120 accepts the service flow containing the ROHC classification, the service flow authorization (SFA) 112 triggers a ROHC per-channel parameter negotiation after a service flow negotiation procedure.

The service flow authorization (SFA) 112 generates service flow information of the service flow for the ROHC packet transmitting/receiving method, so that the access service network gateway (ASN-GW) 110, the base station 118 and the mobile station (MS) 120 can obtain the service flow information.

A data path ID corresponding to a sub-TLV of service flow information includes a data path tag such as a generic routing encapsulation key (GRE key) mapped to the service flow. Also, the service flow information includes a ROHC parameter obtained through the information exchange between the ROHC compressor and ROHC de-compressor in the access service network gateway (ASN-GW) 110. In this case, the ROHC parameter may include a ROHC per-channel parameter, a ROHC per-context parameter, a profile, a context, a ROHC context ID, and a classifier related to whether or not the ROHC should be applied.

Accordingly, before receiving the ROHC packet, the access service network gateway (ASN-GW) 110 and the mobile station (MS) 120 can obtain and store the ROHC parameter, including the ROHC context ID mapped to the service flow and the information concerning whether or not the corresponding service flow receives the ROHC packet through the use of service flow information.

The ROHC function in the access service network gateway (ASN-GW) 110 initiates the per-channel parameter negotiation with the ROHC function 124 in the mobile station (MS) 120. The per-channel parameter negotiation is performed through the negotiation of per-channel parameters between the ROHC compressor and the ROHC de-compressor in the access service network gateway (ASN-GW) 110 and the mobile station (MS) 120. Since the ROHC channel is one-to-one mapped to the service flow, the per-channel parameters are included in the service flow information, and a dynamic service addition message (DSA-REQ/DSA-RSP) including the service flow information is used for the per-channel parameter negotiation.

The ROHC compressor in the access service network gateway (ASN-GW) 110 compresses IP headers into ROHC packet headers with ROHC contexts. The ROHC de-compressor maintains header contexts, and reconstructs original headers from compressed headers.

The data path function (DPF) 114 performs a classification for downlink (DL) packet, and checks whether or not it requires the ROHC compression. If the DL packets belong to the ROHC channel, the data path function (DPF) 114 transmits the DL packets to the ROHC compressor. Then, the data path function (DPF) 114 performs an encapsulation of R6 (data path between the base station and the mobile station) data path tag, and transmits it to the base station (BS1) 118. Also, the data path function (DPF) 114 receives uplink (UL) packets from the base station 118. If the UL packets belong to the ROHC channel, the data path function (DPF) 114 transmits the UL packets to the ROHC de-compressor.

The base station 118 maintains a mapping relationship between the R6 data path tag and a connection ID (802.16e CID). The base station 118 processes the DL packets by replacing R6 GRE key corresponding to the R6 data path tag with the 802.16e CID, and processes the UL packets by replacing the 802.16e CID with the R6 GRE key.

The mobile station (MS) 120 establishes a channel between the ROHC function 124 and a CS layer when the dynamic service addition (DSA) message contains a ROHC type. If the DL packets belong to the ROHC channel, the DL packets are transmitted to the ROHC de-compressor in the ROHC function 124.

For UL traffic, the mobile station (MS) 120 performs a classification to identify whether or not the packets require the ROHC compression. If the UL packet belongs to the ROHC channel, the mobile station (MS) 120 performs the ROHC compression. Then, the mobile station (MS) 120 transmits the UL packet to the base station 118 through the use of the appropriate 802.16e CID mapped to the ROHC channel of the UL packet.

Figure 2:
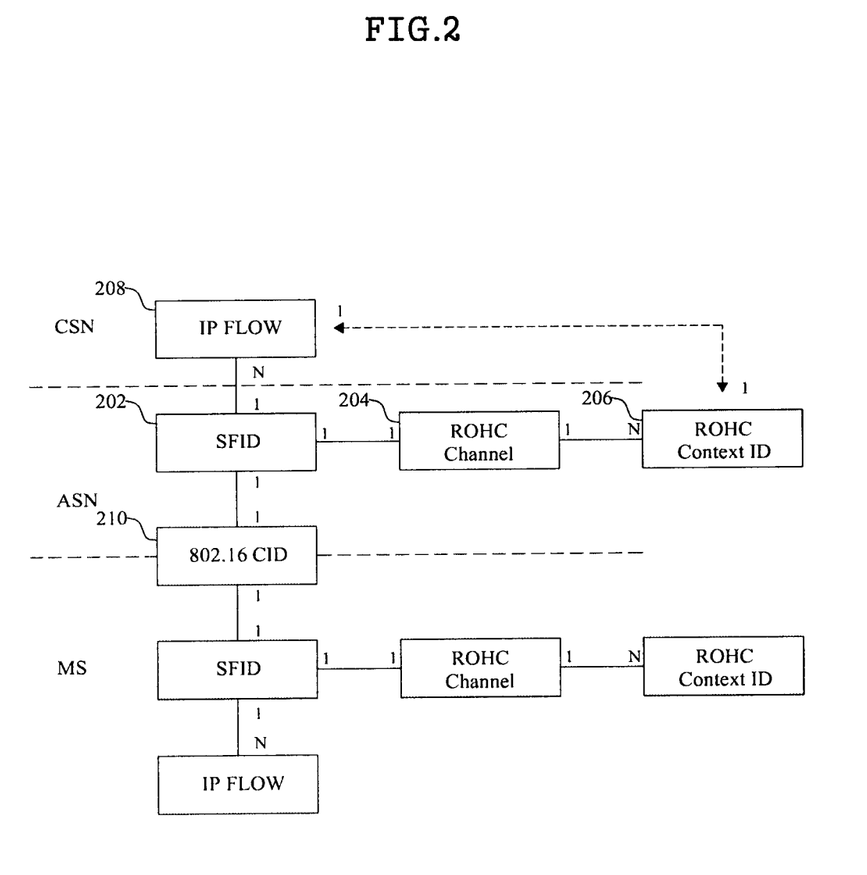
FIG. 2 is a block diagram illustrating a mapping relationship between a ROHC context ID and a service flow for a ROHC packet transmission in a wireless communication system according to one embodiment of the present invention.

FIG. 2 illustrates the mapping relationship between the ROHC context ID and the service flow for the ROHC packet transmitting/receiving method in the wireless communication system according to one embodiment of the present invention. Herein, the mapping relationship between the service flow and the ROHC channel is 1:1. One ROHC channel may have an IP flow using the plurality of ROHC. In this case, the ROHC channel means a header-compression transmission channel to be applied by ROHC.

According to one example of the downlink (DL) packet which can have the IP flow 208 of 'N' types transmitted from the connectivity service network (CSN) 102, the mapping relationship between the IP flow 208 and the service flow ID (SFID) 202 is N:1 ('N' is a positive integer), and the mapping relationship between the ROHC context ID 206 and the IP flow 208 is 1:1.

The mapping relationship between the ROHC channel 204 corresponding to a logic channel and the service flow ID (SFID) 202 in the access service network (ASN) 108 is 1:1. At this time, the mapping relationship between the ROHC channel 204 and the ROHC context ID 206 is 1:N ('N' is a positive integer). As a result, the mapping relationship between the service flow ID (SFID) 202 and the ROHC context ID 206 through the ROHC channel 204 is 1:N ('N' is a positive integer).

Since the service flow ID (SFID) 202 is mapped to the connection ID (CID) 210 between the base station 118 and the mobile station (MS) 120 by 1:1 correspondence, the mapping relationship between the connection ID (CID) 210 and the ROHC context ID 206 is also 1:N. In this case, the aforementioned mapping relationships are identically applied in the access service network (ASN) 108 and the mobile station (MS) 120.

The aforementioned mapping relationships are recognized in the access service network (ASN) 108 and the mobile station (MS) 120 when creating the service flow for ROHC. Through the aforementioned mapping relationships, the access service network gateway (ASN-GW) 118 and the mobile station (MS) 120 can identify whether or not the ROHC should be applied to the packet. That is, the ASN-GW, base station or mobile station to be received with the ROHC packet can be identified through the mapping relationships. The base station 118 and the mobile station (MS) 120 can obtain the service flow information through the mapping relationship.

The service flow information may include a packet classification rule, a ROHC/ECRTP (Enhanced Compressed RTP) context ID, a classifier type, or a convergence sub-layer parameter encoding rule (CS parameter encoding rule) as the sub-TLV.

Whether or not the ROHC should be applied is defined by the CS parameter encoding rule. The ROHC context ID 206 is defined by the ROHC/ECRTP context ID. Accordingly, the access service network gateway (ASN-GW) 110 and the mobile station (MS) 120 can identify whether or not the ROHC is applied to the corresponding service flow by checking the service flow information, and can obtain the ROHC context ID 206 mapped to the IP flow included in the corresponding service flow.

Also, the base station 118 obtains the mapping information of the connection ID 210 and the data path ID (GRE key) corresponding to the service flow through the use of service flow information.

The mobile station (MS) 120 obtains the mapping information of the ROHC channel 204 including the ROHC context ID 206 and the connection ID 210 between the mobile station (MS) 120 and the base station 118 corresponding to the service flow through the use of service flow information.

Through the aforementioned mapping information, the access service network gateway (ASN-GW) 110 can identify whether or not the ROHC is applied to the received DL packet, and can identify the base station 118 to be received with the ROHC packet after performing the ROHC compression. The base station 118 can identify the mobile station (MS) 120 to be received with the ROHC packet. The mobile station (MS) 120 can identify whether or not the ROHC should be applied to the ROHC packet, and can perform the ROHC de-compression. In a case of the UL packet, the aforementioned steps are performed in reverse order.

Referring to FIG. 1, the service flow information, including the ROHC parameter such as the ROHC context ID and the information about whether or not the ROHC should be applied, and being created by the SFA 112, is included in a data path registration request (Path_Reg_Req) message. The data path registration request (Path_Reg_Req) message including the service flow information is transmitted from the access service network gateway (ASN-GW) 110 to the base station 118.

Then, the service flow information included in a dynamic service addition (DSA_REQ) message may be transmitted from the base station 118 to the mobile station (MS) 120. In this case, since the data path registration request (Path_Reg_Req) message and the dynamic service addition (DSA_REQ) message can include the service flow information as TLV, the ROHC parameter can be transmitted through the data path registration request (Path_Reg_Req) message and the dynamic service addition (DSA_REQ) message.

Also, the service flow information including the predetermined ROHC parameter is transmitted from the mobile station (MS) 120 to the access service network gateway (ASN-GW) 110 through the Path_Reg_Rsp message and DSA-RSP message. That is, the access service network gateway (ASN-GW) 110 and the mobile station (MS) 120 can perform the ROHC negotiation by exchanging the ROHC parameter through the service flow information included in Path_Reg_Req/Rsp and DSA_REQ/RSP.

Hereinafter, a TLV hierarchy of the service flow information, transmitted by the Path_Reg_Req/Rsp message and DSA-REQ/RSP message, including the ROHC context ID and the information about whether or not the ROHC should be applied will be explained with reference to FIGS. 3A and 3B.

Figure 3A:
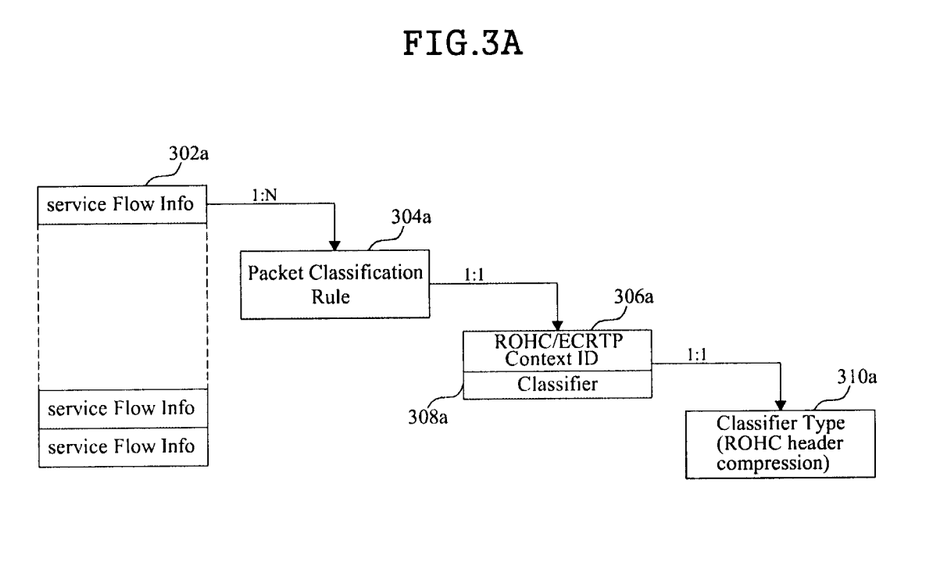
FIGS. 3A and 3B are block diagrams illustrating a TLV hierarchy of service flow information included in a message between an access service network gateway (ASN-GW) and a base station, and between a base station and a mobile station in a wireless communication system according to one embodiment of the present invention.

FIG. 3A illustrates the TLV hierarchy of the service flow information included in the message between the access service network gateway (ASN-GW) and the base station in the wireless communication system according to one embodiment of the present invention.

The message between the access service network gateway (ASN-GW) and the base station, the Path_Reg_Req/Rsp message may include service flow information 302a as TLV, wherein the service flow information 302a may include a packet classification rule 304a as sub-TLV. The packet classification rule 304a may include a ROHC/ECRTP context ID 306a and a classifier 308a as sub-TLV, and the classifier 308a may includes a classifier type 310a as sub-TLV.

Referring to FIG. 3A, whether or not the ROHC should be applied may be defined by the classifier type 310a. The ROHC context ID mapped to the service flow for the ROHC packet transmitting/receiving method may be defined by the ROHC/ECRTP context ID 306a.

Figure 3B:
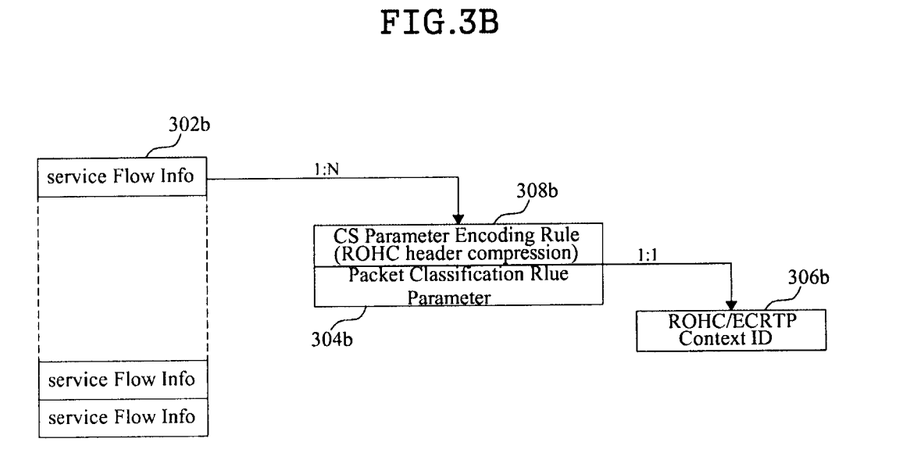

FIG. 3B illustrates the TLV hierarchy of the service flow information included in the message between the base station and the mobile station in the wireless communication system according to one embodiment of the present invention.

The message between the base station and the mobile station, the DSA-REQ/RSP message may include service flow information 302b as TLV, wherein the service flow information 302b may include a packet classification rule parameter 304b and a CS parameter encoding rule 308b as sub-TLV. Also, the packet classification rule parameter 304b may include a ROHC/ECRTP context ID 306b as sub-TLV.

Referring to FIG. 3B, whether or not the ROHC should be applied may be defined by the CS parameter encoding rule 308b of the TLV. The ROHC context ID mapped to the service flow for the ROHC packet transmitting/receiving method may be defined by the ROHC/ECRTP context ID 306b.

The aforementioned service flow information 302b may include the sub-TLV (not shown) including the other ROHC parameter as well as the ROHC context ID and the information about whether or not the ROHC should be applied.

Through the service flow information 302b, transmitted by the Path_Reg_Req message and the DSA-REQ/RSP message, including the aforementioned TLV hierarchy, the access service network gateway (ASN-GW) 110 and the mobile station (MS) 120 can previously recognize the ROHC parameter to identify the ROHC context ID 110 and whether the corresponding service flow should be applied by ROHC, before the ROHC packet transmission.

Figure 3C:
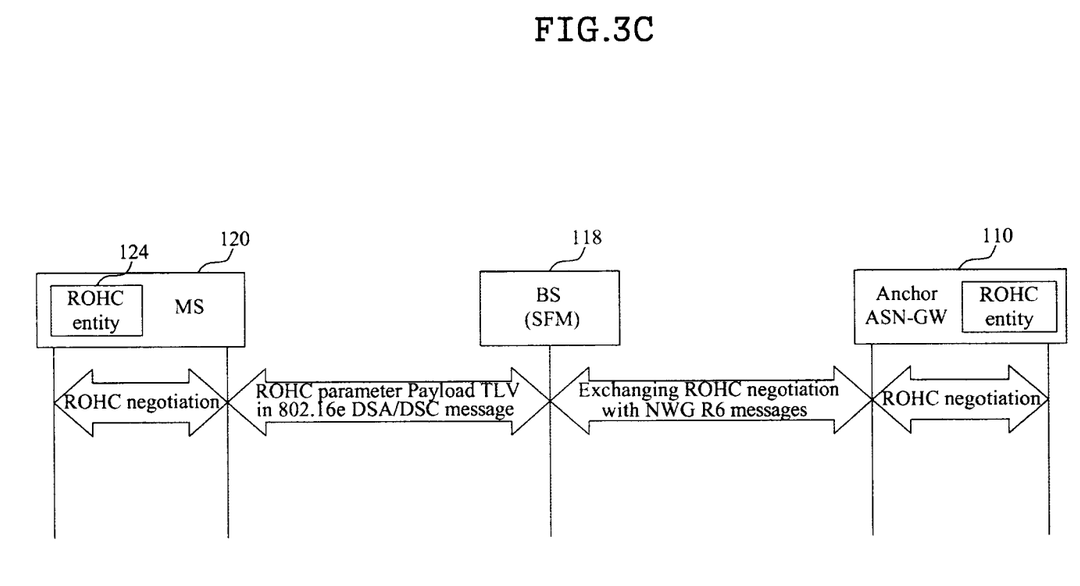
FIG. 3C is a flow chart illustrating a ROHC negotiation procedure according to one embodiment of the present invention.

FIG. 3C illustrates the ROHC negotiation procedure according to one embodiment of the present invention. As shown in the drawing, the ROHC negotiation procedure is initiated by the DSA-REQ message or DSC-REQ message in 802.16e. At this time, 802.16e MAC layer does not interpret the ROHC parameter payload TLV.

The base station 118 and the mobile station (MS) 120 perform the ROHC negotiation procedure through the use of DSA-REQ/RSP or DSC-REQ/RSP including the ROHC parameter for the ROHC negotiation as the TLV. The mobile station (MS) 120 performs the ROHC negotiation procedure so that the ROHC parameter for the ROHC negotiation can be exchanged in the ROHC entity 124 of the mobile station (MS) 120. The base station 118 and anchor access service network gateway (anchor ASN-GW) 110 exchange the ROHC parameter included in the message used for the data path (R6) between the base station 118 and the access service network gateway (ASN-GW) 110 with each other, to thereby perform the ROHC negotiation procedure.

The anchor access service network gateway (anchor ASN-GW) 110 performs the ROHC negotiation procedure to make the ROHC parameter for the ROHC negotiation exchanged in the ROHC entity of the anchor access service network gateway (anchor ASN-GW) 110.

Referring to FIG. 1, the access service network gateway (ASN-GW) 110 receives the subscriber profile including the dynamic service flow information with the ROHC policy from the authentication-authorization-accounting (AAA) 104 or the policy and charging rules function (PCRF) 106 during the dynamic service flow establishing procedure. Then, the access service network gateway (ASN-GW) 110 determines whether or not the ROHC should be applied to the dynamic service flow. The access service network gateway (ASN-GW) 110 initiates the procedure of the dynamic service flow, and triggers the ROHC negotiation between the access service network gateway (ASN-GW) 110 and the mobile station (MS) 120. Hereinafter, the detailed procedure of the dynamic service flow with ROHC will be explained with reference to FIGS. 4 to 6.

Figure 4:
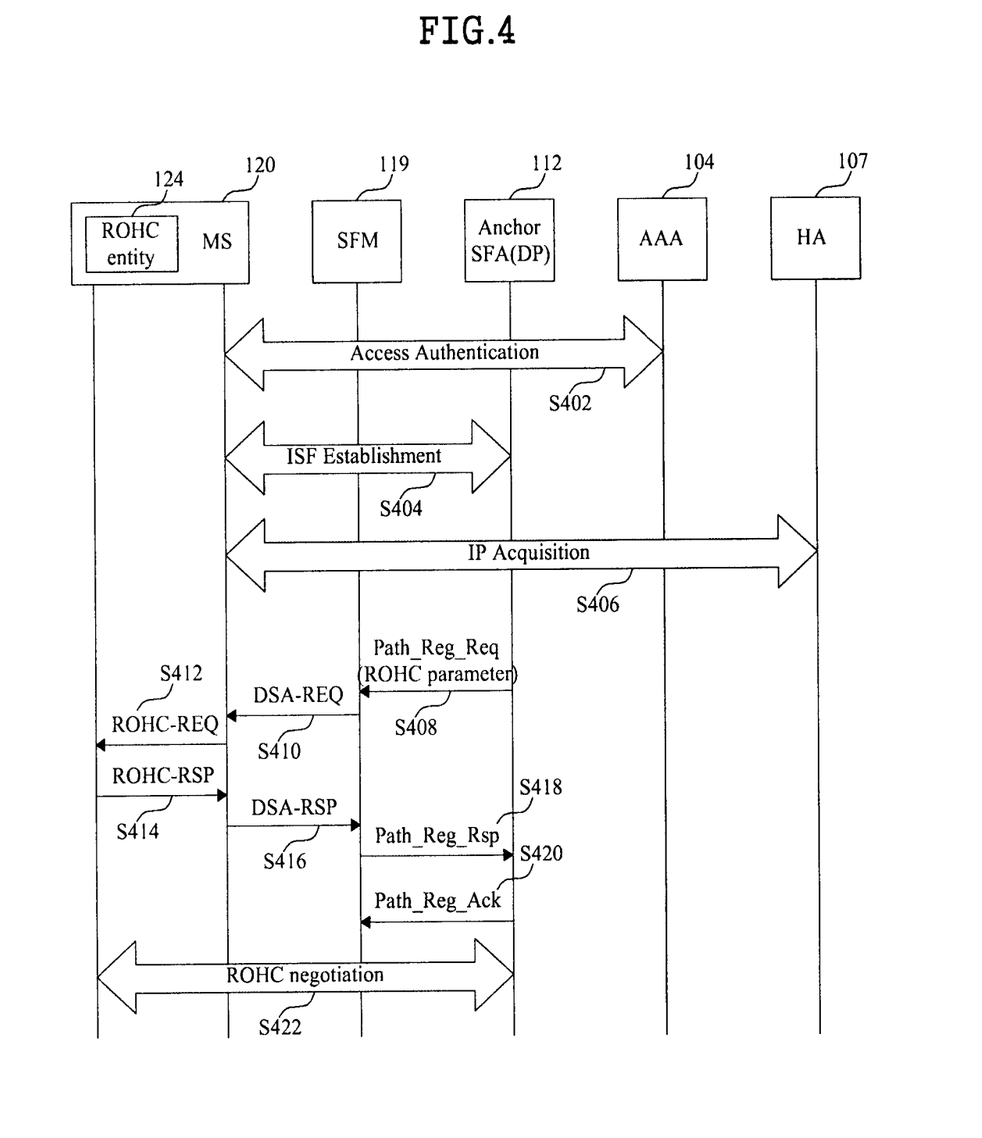
FIG. 4 is a flow chart illustrating an AAA-initiated service flow creation method for ROHC according to one embodiment of the present invention.

FIG. 4 is a flow chart showing an AAA-initiated ROHC service flow creation method according to one embodiment of the present invention. For convenience of the explanation, the AAA-initiated ROHC service flow creation method will be explained with reference to FIGS. 1 to 3.

FIG. 4 illustrates the detailed message flow and service flow creation procedure for establishing the ROHC channel when the ROHC entities are located in the mobile station (MS) 120 and the access service network gateway (ASN-GW) 110. Also, the service flow creation for the ROHC channel establishment may be initiated by the base station 118 or the mobile station (MS) 120.

First, an access authentication procedure is performed between the mobile station (MS) 120 and the authentication-authorization-accounting (AAA) 104 (S402). During the access authentication procedure, the mobile station (MS) 120 and the access service network gateway (ASN-GW) receive the subscriber profile containing the pre-provisioned service flow information with the ROHC policy from the authentication-authorization-accounting (AAA) 104.

Next, an initial service flow establishment (ISF) procedure is performed between the mobile station (MS) 120 and anchor service flow authorization (anchor SFA) 112 (S404). At this time, the access service network gateway (ASN-GW) 110 triggers the anchor service flow authorization (anchor SFA) 112 to create the initial service flow (ISF), and optionally other pre-provisioned service flows. Then, the mobile station (MS) 120 performs an IP acquisition procedure with the home agent (HA) 107 (S406).

The ROHC function of the access service network gateway (ASN-GW) 110 triggers the anchor service flow authorization (anchor SFA) 112 to create the service flow for ROHC. At this time, the ROHC function of the access service network gateway (ASN-GW) 110 transmits the ROHC parameter to the anchor service flow authorization (anchor SFA) 112. The anchor service flow authorization (anchor SFA) 112 transmits the data path registration request (Path_Reg_Req) message to the service flow management (SFM) 119 (S408).

In one embodiment of the present invention, the service flow information included in the Path_Reg_Req message may have a reservation action TLV which request the creation of service flow for ROHC.

As shown in FIGS. 3A and 3B, the Path_Reg_Req/Rsp, DSA-REQ/RSP and DSC-REQ/RSP may include the service flow information as the sub-TLV. Also, the service flow information may include the ROHC parameter such as the classifier considering whether or not the ROHC is applied, the ROHC context ID, and the per-channel parameter.

Referring to FIG. 4, when the service flow management (SFM) 119 receiving the Path_Reg_Req verifies whether there are sufficient radio resources, and determines whether or not the service flow request for ROHC should be accepted. If it is determined that the service flow request for ROHC should be accepted, the dynamic service addition request DSA-REQ message according to IEEE 802.16e is transmitted to the mobile station (MS) 120 (S410). At this time, the dynamic service addition request DSA-REQ message includes the service flow information containing the ROHC parameter.

Upon receiving the DSA-REQ message from the service flow management (SFM) 119, the mobile station (MS) 120 checks whether or not the DSA-REQ message includes the ROHC parameter payload TLV. If the DSA-REQ message includes the ROHC parameter payload TLV, the mobile station (MS) 120 transmits the ROHC-REQ message to an upper layer, ROHC layer (S412). At this time, a service access point (SAP) between a convergence sub-layer (CS) and the ROHC layer is created and it is used to map the connection ID (802.16e CID) and the service flow ID (SFID) in the convergence sub-layer (CS).

In one embodiment of the present invention, when the mobile station (MS) 120 receives the downlink packet, the classification procedure may be performed to determine whether or not the downlink packet should be applied by ROHC according to the connection ID, the service flow ID, and the mapping information about the ROHC channel ID of the ROHC channel in the mobile station (MS) 120. Also, a procedure for determining whether or not the uplink packet should be applied by ROHC can be performed through the use of mapping information.

Meanwhile, the classification rules received through the DSA-REQ message are included in the ROHC-REQ message to classify the packets to be compressed by ROHC entity 124.

The ROHC entity 124 in the mobile station (MS) 120 adds the ROHC context ID received through the ROHC-REQ message to a mapping table, and transmits the result to the MAC layer using ROHC-RSP message through the ROHC service access point created previously (S414).

Next, the mobile station (MS) 120 identifies the connection ID and the service flow ID (SFID) through the use of ROHC service access point index (ROHC SAP index), and then transmits the DSA-RSP message to the service flow management (SFM) 119 (S416). At this time, the dynamic service addition RSP (DSA-RSP) message includes the ROHC parameter for the ROHC negotiation. If the ROHC parameter for the ROHC negotiation is obtained from the ROHC entity 124 of the mobile station (MS) 120, and the ROHC parameter is for the negotiation of the ROHC entity (ROHC function) of the access service network gateway (ASN-GW) 110.

If the ROHC negotiation cannot be completed through the DSA procedure, it can be continued using dynamic service change (DSC) messaging at the link layer in S422.

Next, the service flow management (SFM) 119 transmits the path registration response message (Path_Reg_Rsp) to the anchor service flow authorization (anchor SFA) 112 to confirm the reservation (S418). If the reduced resources were granted by the service flow management (SFM) 119, the QoS parameter set of the granted resources is returned to the anchor service flow authorization (SFA) 112 by the service flow management (SFM) 119. At this time, the parameter for the ROHC negotiation, included in the path registration response message (Path_Reg_Rsp), is transmitted to the ROHC entity of the access service network gateway (ASN-GW) 110.

Then, the anchor service flow authorization (anchor SFA) 112 transmits the path registration acknowledge response message (Path_Reg_Ack) to the service flow management (SFM) 119 to confirm the reservation (S420). If the reduced resources were granted by the service flow management (SFM) 119, the QoS parameter set of the granted resources is returned to the anchor service flow authorization (SFA) 112 by the service flow management (SFM) 119.

If the ROHC negotiation cannot be completed through the DSA procedure, the ROHC negotiation is continued using DSC procedure until it is completed (S422). In one embodiment of the present invention, the DSC procedure may be the negotiation procedure to exchange the ROHC parameter between the mobile station (MS) 120 and the service flow management (SFM) 119 through the request/response message (DSC-REQ/RSP).

Figure 5:
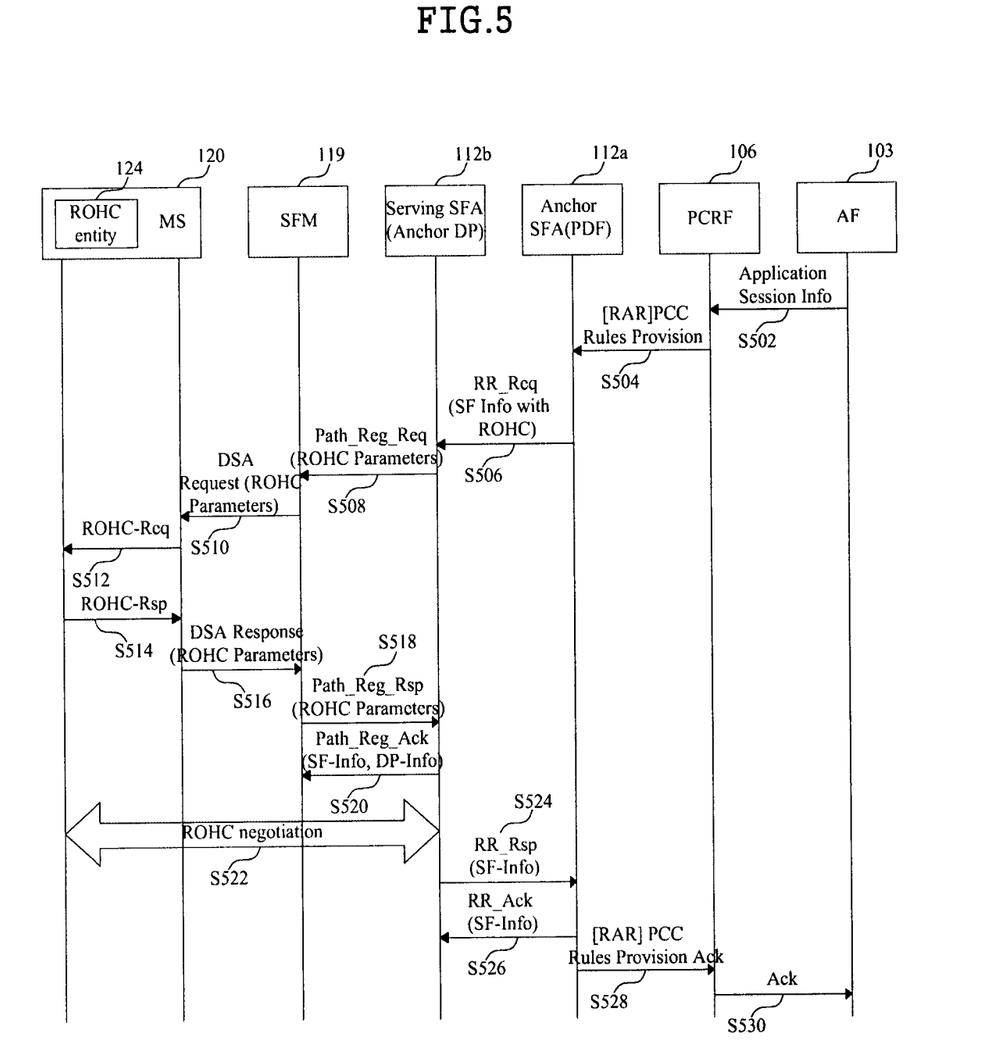
FIG. 5 is a flow chart illustrating a PCRF-initiated service flow creation method for ROHC according to another embodiment of the present invention.

FIG. 5 is a flow chart illustrating the PCRF-initiated ROHC service flow creation method according to another embodiment of the present invention. For convenience of the explanation, the PCRF-initiated ROHC service flow creation method will be explained with reference to FIGS. 1 to 3, and the explanation understood by FIG. 4 will be omitted.

An application function (AF) 103 provides service information (application level session info) to the policy and charging rules function (PCRF) 106 for an AF session signaling (S502).

Then, the policy and charging rules function (PCRF) 106 makes the authorization and policy decisions, and provides new policy and charging control (PCC) decisions including ROHC policy to the anchor service flow authorization (anchor SFA) 112 (S504). In one embodiment of the present invention, the aforementioned PCC rule provision may be performed through a Re-Auth-Request (RAR) message.

Next, a policy decision function (PDF) of anchor service flow authorization (anchor SFA) 112a receives the QoS profile from the policy and charging rules function (PCRF) 106. The policy decision function (PDF) transmits a resource-reservation request (RR_Req) message including the QoS parameter to a serving service flow authorization (serving SFA) 112b (S506). In one embodiment of the present invention, the resource-reservation request message (RR_Req) includes service flow information for ROHC.

The serving service flow authorization (serving SFA) 112b transmits the Path_Reg_Req message including the received QoS info TLV and the ROHC parameter to the service flow management (SFM) 119 (S508).

The service flow management (SFM) 119 verifies whether there are sufficient radio resources, and decides whether or not the service flow request for ROHC should be accepted based on the QoS-Info parameter and the available resources. If it is accepted, the base station 118 transmits the DSA-REQ message corresponding IEEE 802.16e to the mobile station (MS) 120. At this time, the DSA-REQ message includes the ROHC parameter and ROHC classification rule.

Upon receiving the DSA-REQ message from the service flow management (SFM) 119, the mobile station (MS) 120 checks whether or not the DSA-REQ message includes ROHC parameter payload TLV. If the DSA-REQ message includes the ROHC parameter payload TLV, the mobile station (MS) 120 transmits a ROHC-REQ message to an upper layer, ROHC layer (S512).

At this time, a service access point (SAP) between a convergence sub-layer (CS) and the ROHC layer is created and it is used to map the connection ID (802.16e CID) and the service flow ID (SFID) in the convergence sub-layer (CS). The classification rule received through the DSA-REQ is included in the ROHC-REQ message to classify the packets to be compressed by ROHC entity 124.

Then, the ROHC entity 124 in the mobile station (MS) 120 adds the ROHC context ID to the mapping table, and transmits the result to the MAC layer using the ROHC-RSP message through the ROHC service access point created previously (S514).

The mobile station (MS) 120 identifies the connection ID (802.16e CID) and the service flow ID (SFID) through the use of ROHC service access point index (ROHC SAP index), and then transmits the DSA-RSP message to the service flow management (SFM) 119 (S516). At this time, the DSA-RSP message includes the ROHC parameter for the ROHC negotiation. If the ROHC negotiation cannot be completed through the DSA procedure, it can be continued using dynamic service change (DSC) messaging at the link layer in S522.

Supposing the request of creating the service flow for ROHC is granted by the service flow management (SFM) 119 (S506), and the mobile station (MS) 120 (S508), the service flow management (SFM) 119 transmits the Path_Reg_Rsp message to the serving service flow authorization (serving SFA) 112*b* to confirm the reservation (S518). If the reduced resources were granted by the service flow management (SFM) 119, the QoS parameter set of the granted resources is returned by the service flow management (SFM) 119. At this time, the Path_Req_Rsp message includes the ROHC parameter for the ROHC negotiation.

Then, the serving service flow authorization (serving SFA) 112*b* transmits the Path_Reg_Ack to the service flow management (SFM) 119 (S520). If the ROHC negotiation can not be completed through the DSA procedure, the ROHC negotiation can be continued using the DSC procedure until it is completed (S522).

If there is the successful response from the service flow management (SFM) 119, the serving service flow authorization (serving SFA) 112*b* transmits the resource-reservation response (RR_Rsp) message with the QoS-Info parameters including the granted QoS values to the anchor service flow authorization (anchor SFA) 112*a* to confirm the reservation (S524).

If there is the successful response from the serving service flow authorization (serving SFA) 112*b*, the anchor service flow authorization (serving SFA) 112*a* transmits the resource-reservation acknowledge response (RR_Ack) message to the serving service flow authorization (serving SFA) 112*b* (S526).

Then, the policy decision function (PDF) of the anchor service flow authorization (anchor SFA) 112*a* transmits the PCC rule provision acknowledge message including the PCC decision to the policy and charging rules function (PCRF) 106 (S528).

The policy and charging rules function (PCRF) 106 transmits the PCC rule provision acknowledge message including the PCC decision to the application function (AF) 103 (S530).

Figure 6:
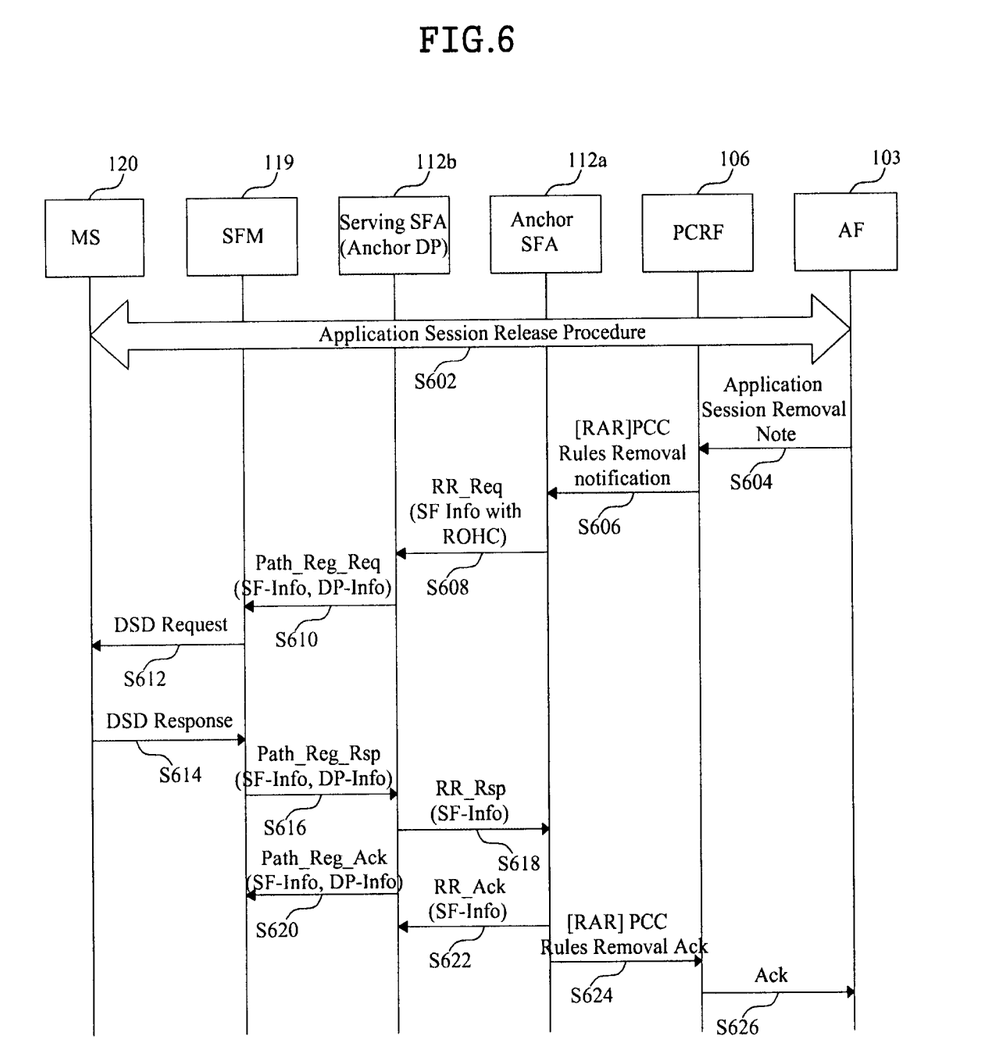
FIG. 6 is a flow chart illustrating a PCRF-initiated service flow deletion method according to another embodiment of the present invention.

FIG. 6 is a flow chart illustrating the PCRF-initiated ROHC service flow deletion method according to another embodiment of the present invention. For convenience of the explanation, the PCRF-initiated ROHC service flow deletion method will be explained with reference to FIGS. 1 to 3, and the explanation understood by FIGS. 4 and 5 will be omitted.

First, the mobile station (MS) 120 and the application function (AF) 103 such as 3GPP CSCF (call session control function) completes an application session release procedure (S602).

The application function (AF) 103 provides service information for an AF session signaling to the policy and charging rules function (PCRF) 106 (S604). At this time, the service information includes an application session removal note.

Then, the policy and charging rules function (PCRF) 106 makes the authorization and policy decision, and provides all new PCC decisions to the policy decision function (PDF) of the anchor service flow authorization (anchor SFA) 112*a* (S606) In one embodiment of the present invention, the provision of PCC decisions can be performed through the use of RAR (Re-Auth-Request) message including PCC rule removal notification.

The policy decision function (PDF) of the anchor service flow authorization (anchor SFA) 112*a* receives the QoS profile from the policy and charging rules function (PCRF) 106. Then, the policy decision function (PDF) transmits the RR_Req message including the QoS parameter to the serving service flow authorization (serving SFA) 112*b* (S608). At this time, the RR_Req message includes the service flow information for ROHC.

In one embodiment of the present invention, the service flow information included in the RR_Req message may include the reservation action TLV for requesting the deletion of service flow for ROHC.

Next, the serving service flow authorization (serving SFA) 112*b* checks whether or not a data path should be created. If there is the data path, the serving service flow authorization (serving SFA) 112*b* transmits the Path_Reg_Req including the received QoS information TLV to the service flow management (SFM) 119 of the base station 118 (S610).

In one embodiment of the present invention, the service flow information included in the Path_Reg_Req may include the reservation action TLV for requesting the deletion of the service flow for ROHC.

The service flow management (SFM) 119 verifies whether there are sufficient radio resources, and decides whether or not the request should be accepted based on the QoS-Info parameter and the available resources. If the request is accepted, the base station 118 transmits the dynamic service deletion request (DSD-REQ) message corresponding to IEEE 802.16e to the mobile station (MS) 120 (S612).

According to IEEE 802.16e, the mobile station (MS) 120 may accept or reject the deletion request of the service flow for ROHC by the DSD-REQ message. Then, the mobile station (MS) 120 transmits the DSD-RSP message to the service flow management (SFM) 119 (S614).

The service flow management (SFM) 119 transmits the Path_Reg_Rsp to the serving service flow authorization (serving SFA) 112*b* to confirm the reservation (S616). If the reduced resources were granted by the service flow management (SFM) 119, the Path_Reg_Rsp message should include the granted QoS parameter set.

If there is the successful response from the service flow management (SFM) 119, the serving service flow authorization (serving SFA) 112*b* transmits the RR_Rsp message including the QoS-Info parameter to the anchor service flow authorization (anchor SFA) 112*a* to confirm the reservation (S618).

Then, the serving service flow authorization (serving SFA) 112*b* transmits the Path_Reg_Ack message to the service flow management (SFM) 119 (S620).

If there is the successful response from the serving service flow authorization (serving SFA) 112*b*, the anchor service flow authorization (anchor SFA) 112*a* transmits the RR_Ack to the serving service flow authorization (serving SFA) 112*b* (S622).

The policy decision function (PDF) transmits the ACK message considering the acceptance or rejection of the PCC decision to the policy and charging rules function (PCRF) 106 (S624).

The policy and charging rules function (PCRF) 106 stores the service information therein, and transmits the ACK message to the application function (AF) 103.

Figure 7:
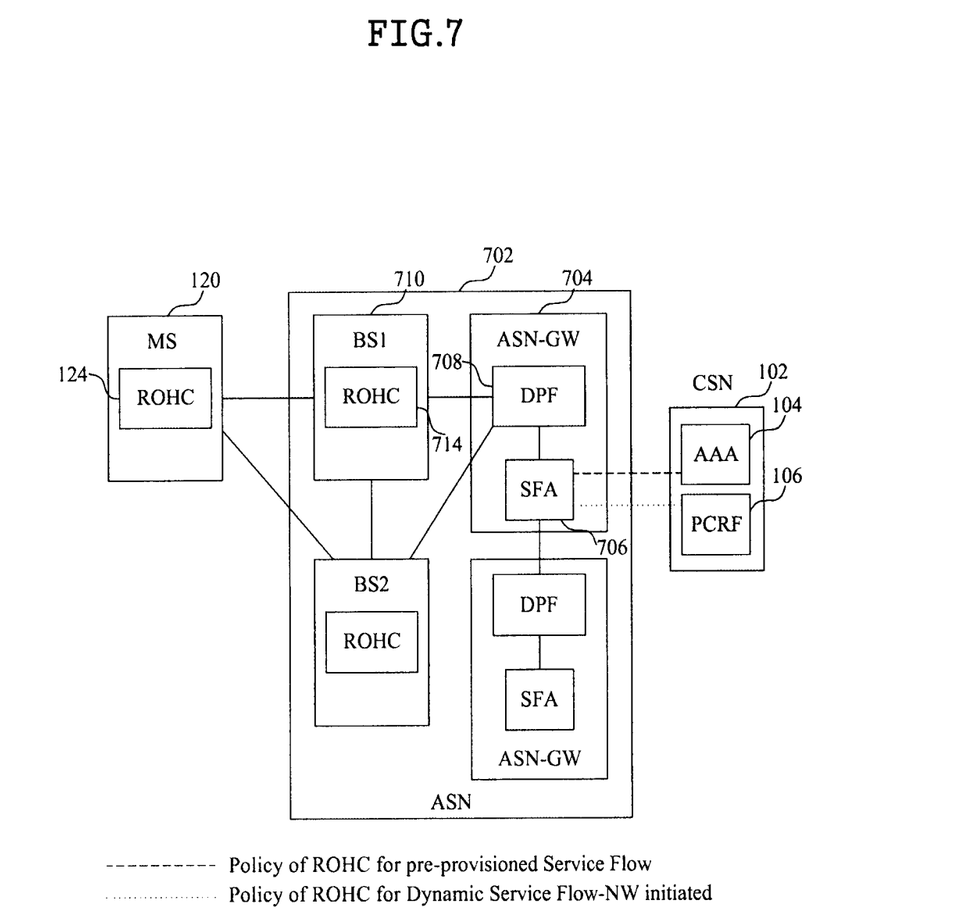
FIG. 7 is a block diagram illustrating a wireless communication system supporting service flow creation and deletion for ROHC according to another embodiment of the present invention.

FIG. 7 illustrates a wireless communication system supporting creation and deletion of service flow for ROHC according to another embodiment of the present invention.

Referring to FIG. 7, the wireless communication system supporting creation and deletion of service flow for ROHC according to another embodiment of the present invention includes a connectivity service network (CSN) 102, an access service network (ASN) 702, and a mobile station (MS) 120. In this case, ROHC downlink packets are transmitted from the connectivity service network (CSN) 102 to the mobile station (MS) 120, and ROHC uplink packets are transmitted from the mobile station (MS) 120 to the connectivity service network (CSN) 102. Hereinafter, the explanation for some parts in FIG. 7, whose function is the same as those of FIG. 1, will be omitted.

The access service network (ASN) 702 includes an access service network gateway (ASN-GW) 704 serving as a control station, and a base station (BS1) 710 which performs ROHC compression for downlink packets and ROHC de-compression for uplink packets.

The access service network gateway (ASN-GW) 704 includes a service flow authorization (SFA) 706 and a data path function (DPF) 708.

The service flow authorization (SFA) 706 generates service flow information of service flow for ROHC packet transmitting/receiving method, so that the access service network gateway (ASN-GW) 704, the base station 710 and the mobile station (MS) 120 can obtain the service flow information.

A data path ID corresponding to a sub-TLV of service flow information includes a data path tag such as a generic routing encapsulation key (GRE key) mapped to the service flow.

Also, the service flow information includes a ROHC parameter obtained through an information exchange between a ROHC compressor and a ROHC de-compressor in a ROHC function 714 of the base station 710. At this time, the ROHC parameter may include a ROHC per-channel parameter, a ROHC per-context parameter, a profile, a context, a ROHC context ID, and a classifier related to whether or not the ROHC should be applied.

Accordingly, the base station 710 and the mobile station (MS) 120 can obtain the ROHC parameter by performing the ROHC negotiation through the service flow information, before receiving the ROHC packet.

During the service flow creation procedure for the ROHC packet transmission, the service flow information including the ROHC parameter may be transmitted between the access service network gateway (ASN-GW) 704 and the base station 710 while being included in Path_Reg_Req/Rsp message, and may be transmitted between the base station 710 and the mobile station (MS) 120 while being included in DSA-REQ message. At this time, since the Path_Reg_Req/Rsp message and the DSA-REQ message can include the service flow information as a TLV, the Path_Reg_Req/Rsp message and the DSA-REQ message can transmit the ROHC parameter.

Whether or not the ROHC should be applied and the ROHC context ID can be included in the Path_Reg_Req/Rsp message and the DSA-REQ/RSP message by the service flow information having a TLV hierarchy shown in FIGS. 3A and 3B.

The data path function (DPF) 708 of the access service network gateway (ASN-GW) 704 performs an encapsulation procedure for adding the data path tag mapped to the service flow of the downlink packet to the downlink packet transmitted from the connectivity service network (CSN) 102, and transmits it to the base station 710.

Also, when the data path function (DPF) 708 receives the uplink packet from the base station 710, the data path function (DPF) 708 performs a de-capsulation procedure for the uplink packet, and transmits it to the connectivity service network (CSN) 102.

The base station 710 includes a ROHC function 714 and a data path function (DPF, not shown). The base station 710 compresses the downlink packet by ROHC, and transmits it to the mobile station (MS) 120. Also, the base station 710 de-compresses the ROHC uplink packet by ROHC, and transmits it to the access service network gateway (ASN-GW) 704.

The base station 710 creates and deletes the service flow for ROHC through the DSA/DSC/DSD procedures with the mobile station (MS) 120. Also, the base station 710 transmits the DSA/DSC/DSD-related message including the service flow information with the ROHC parameter to the mobile station (MS) 120 so that the ROHC context ID is stored in the mobile station (MS) 120 and the ROHC negotiation is performed.

The ROHC function 714 is arranged together with the data path function, wherein the ROHC function 714 includes a ROHC compressor (not shown) and a ROHC de-compressor (not shown).

The ROHC function 714 performs the ROHC compression and ROHC de-compression, and triggers the creation of service flow for ROHC. Also, the ROHC function 714 of the base station 710 exchanges the ROHC parameter with the ROHC function 124 of the mobile station (MS) 120 by the ROHC negotiation procedure.

The data path function (DPF) of the base station 710 performs the procedure to determine whether or not the ROHC should be applied to the ROHC downlink packet or ROHC uplink packet.

The procedure of processing the ROHC downlink packet and ROHC uplink packet in the mobile station (MS) 120 is described by FIG. 1, which will be omitted.

In the wireless communication system of FIG. 1, the access service network gateway (ASN-GW) 110 includes the ROHC entity. In case of the wireless communication system of FIG. 7, the base station 710 includes the ROHC entity 714. That is, the two wireless communication systems of FIGS. 1 and 7 are different in the location of ROHC entity. Accordingly, the service flow creation and deletion method for ROHC in the wireless communication system of FIG. 7 can be explained with reference to the service flow creation and deletion method of FIGS. 4 to 6, the explanation of which will be omitted.

It will be apparent to those skilled in the art that various modifications and variations can be made in the present invention without departing from the spirit or scope of the inventions. Thus, it is intended that the present invention covers the modifications and variations of this invention provided they come within the scope of the appended claims and their equivalents.

What is claimed is:

1. A method of creating a service flow for ROHC (Robust Header Compression) comprising:
   upon receiving a subscriber profile to which ROHC is applied at a control station, obtaining a first ROHC parameter at the control station from a ROHC entity of the control station;

transmitting a first message for reservation of a ROHC negotiation including the first ROHC parameter for requesting the creation of service flow at the control station to a base station;

upon receiving the first message from the control station at the base station, determining whether or not the service flow creation request is accepted by verifying radio resources;

performing a DSA (Dynamic Service Addition) procedure with a mobile station corresponding to the service flow through the use of a second message including the first ROHC parameter at the base station, wherein the DSA procedure is performed when it is determined that the service flow creation request is accepted;

determining whether or not the ROHC negotiation is completed by the DSA procedure at the control station; and performing a DSC (Dynamic Service Change) procedure with the mobile station for completion of the ROHC negotiation at the base station, wherein the DSC procedure is performed when it is determined that the ROHC negotiation is not completed by the DSA procedure, wherein the control station is separate from the base station and the mobile station, and wherein the first ROHC parameter includes a ROHC context ID, the mapping relationship between the service flow and the ROHC context ID is 1:N, where N is a positive integer greater than one, and the mapping relationship between the ROHC context ID and an IP flow of ROHC packets received and transmitted by the service flow is 1:1.

2. The method according to claim 1, further comprising receiving a response message including a second ROHC parameter for the ROHC negotiation with the mobile station at the control station from the base station.

3. The method according to claim 1, wherein the first ROHC parameter further includes at least any one of per-channel parameter and a classifier related whether or not the ROHC should be applied.

4. The method according to claim 1, wherein the first ROHC parameter is transmitted while being included in service flow information of the service flow for the ROHC.

5. The method according to claim 4, wherein the service flow information includes the ROHC context ID, and classifier related whether or not the ROHC should be applied, as sub-TLV.

6. The method according to claim 1, further comprising, upon receiving a response message of the second message including a second ROHC parameter for the ROHC negotiation from the mobile station at the base station, transmitting the response message of the first message including the second ROHC parameter at the base station to the control station.

7. The method according to claim 1, further comprising, upon receiving the first message including a ROHC parameter for completion of the ROHC negotiation from the control station at the base station, performing the DSC procedure with the mobile station through the use of the second message including the ROHC parameter for completion of the ROHC negotiation at the base station.

8. The method according to claim 1, further comprising, receiving the subscriber profile including dynamic service flow information having a ROHC policy with a policy and charging rules function (PCRF) during an establishing procedure of dynamic service flow at the control station, and determining whether or not the dynamic service flow should be applied by ROHC; and initiating a procedure of the dynamic service flow with ROHC at the control station, and triggering a ROHC negotiation procedure with the mobile station related with the subscriber profile.

9. A wireless communication system comprising:

a control station configured to obtain a first robust header compression (ROHC) parameter from a ROHC entity when a subscriber profile to be applied by ROHC is obtained, and transmit a first message for reservation of a ROHC negotiation including the first ROHC parameter for requesting a creation of a service flow for the ROHC to a base station; and a base station configured to perform a dynamic service addition (DSA) procedure with a mobile station related with the subscriber profile through the use of second message including the first ROHC parameter, wherein the DSA procedure is performed when it is determined that the creation of the service flow is accepted by verifying radio resources, wherein the base station transmits a response message of the first message including a second ROHC parameter to the control station when a response message of the second message including the second ROHC parameter for a ROHC negotiation is received from the mobile station, wherein the base station receives the first message including a ROHC parameter for completion of the ROHC negotiation from the control station and performs a dynamic service change (DSC) procedure with the mobile station through the use of a message including the ROHC parameter for completion of the ROHC negotiation, wherein the DSC procedure is performed when the control station determines that the ROHC negotiation is not completed by the DSA procedure, wherein the control station is separate from the base station and the mobile station, and wherein the first ROHC parameter includes a ROHC context ID, the mapping relationship between the service flow and the ROHC context ID is 1:N, where N is a positive integer greater than one, and the mapping relationship between the ROHC context ID and an IP flow of ROHC packets received and transmitted by the service flow is 1:1.

10. The wireless communication system according to claim 9, wherein the first ROHC parameter further includes at least any one of per-channel parameter and a classifier related whether or not the ROHC should be applied.

11. The wireless communication system according to claim 9, wherein the first ROHC parameter is transmitted while being included in service flow information of the service flow for the ROHC.

12. The wireless communication system according to claim 11, wherein the service flow information includes the ROHC context ID, and classifier related whether or not the ROHC should be applied, as sub-TLV.

* * * * *